US011519262B2

(12) United States Patent
Mishra et al.

(10) Patent No.: US 11,519,262 B2
(45) Date of Patent: Dec. 6, 2022

(54) SYSTEMATIC EVALUATION OF SHALE PLAYS

(71) Applicant: Schlumberger Technology Corporation, Sugar Land, TX (US)

(72) Inventors: Shubham Mishra, Uttar Pradesh (IN); Siddharth Dubey, Kuala Lumur (MY); Dibakar Chakraborty, Gurgaon (IN)

(73) Assignee: Schlumberger Technology Corporation, Sugar Land, TX (US)

( * ) Notice: Subject to any disclaimer, the term of this patent is extended or adjusted under 35 U.S.C. 154(b) by 578 days.

(21) Appl. No.: 16/466,635

(22) PCT Filed: Jan. 17, 2018

(86) PCT No.: PCT/US2018/013934
§ 371 (c)(1),
(2) Date: Jun. 4, 2019

(87) PCT Pub. No.: WO2018/136448
PCT Pub. Date: Jul. 26, 2018

(65) Prior Publication Data
US 2019/0345815 A1   Nov. 14, 2019

(30) Foreign Application Priority Data

Jan. 17, 2017   (IN) .............................. 201741001797

(51) Int. Cl.
*G01V 1/30* (2006.01)
*E21B 47/09* (2012.01)
*G01V 1/34* (2006.01)

(52) U.S. Cl.
CPC .............. *E21B 47/09* (2013.01); *G01V 1/306* (2013.01); *G01V 1/307* (2013.01); *G01V 1/34* (2013.01);

(Continued)

(58) Field of Classification Search
USPC .......................................................... 702/14
See application file for complete search history.

(56) References Cited

U.S. PATENT DOCUMENTS 9,152,745 B2    6/2015  Glinsky
2009/0164188 A1*  6/2009  Habashy ................. E21B 49/00
                                                        703/10

(Continued)

FOREIGN PATENT DOCUMENTS

WO    2015168417 A1   11/2015
WO    2016122792 A1    8/2016
WO    2016187238 A1   11/2016

OTHER PUBLICATIONS

Ogiesoba et al., "Seismic-attribute identification of biillle and TOC-rich zones within the Eagle Ford Shale, Dimmit County, South Texas," Journal of Petroleum Exploration and Production 2014, vol. 4, pp. 133-151.

(Continued)

*Primary Examiner* — Paul D Lee

(57) ABSTRACT

A system, computer-readable medium, and method for determining a potential drilling location, of which the method includes obtaining data representing a subterranean domain. The data includes at least seismic data. The method also includes inverting the seismic data, creating a petroleum systems model of the subterranean domain based at least in part on a result of inverting the seismic data, simulating a dynamic reservoir model of the subterranean domain based at least in part on the petroleum systems model, and identifying the potential drilling location based on a combination of the inverting of the seismic data, creating the petroleum systems model, and simulating the dynamic reservoir model.

17 Claims, 8 Drawing Sheets

(52) U.S. Cl.
CPC .... *G01V 2210/646* (2013.01); *G01V 2210/66* (2013.01); *G01V 2210/663* (2013.01)

(56) References Cited

U.S. PATENT DOCUMENTS

| | | |
|---|---|---|
| 2013/0013209 A1 | 1/2013 | Zhu et al. |
| 2014/0372095 A1 | 12/2014 | Van Der Zee et al. |
| 2015/0039281 A1 | 2/2015 | Meyer et al. |
| 2015/0081265 A1 | 3/2015 | Kauerauf et al. |
| 2015/0362623 A1* | 12/2015 | Miotti ............. G01V 11/00 702/14 |
| 2016/0102530 A1 | 4/2016 | Baranov et al. |
| 2016/0138390 A1 | 4/2016 | Baranov et al. |

OTHER PUBLICATIONS

Niño-Guiza, "Constraining the Aptian Petroleum System of the Walvis Basin, Offshore Namibia—Basin Modeling Results Based on New Well and 3D Seismic Data Interpretation," May 19, 2015 European Regional Conference and Exhibition, Lisbon, Portugal.

International Search Report and Written Opinion for the equivalent International patent application PCT/US2018/013934 dated May 28, 2018.

Extended European Search Report dated Sep. 17, 2020 Application No. 18742345.4.

International Preliminary Report on Patentability for the equivalent International patent application PCT/US2018/013934 dated Aug. 1, 2019.

Gilman and Robinson, "Success and Failure in Shale Gas Exploration and Development: Attributes that Make the Difference", Search and Discovery Article #80132, Adapted from oral presentation at AAPG International Conference and Exhibition, Calgary, Alberta, Sep. 12-15, 2011, 31 pages.

* cited by examiner

SYSTEMATIC EVALUATION OF SHALE PLAYS

BACKGROUND

Prior to and/or while drilling wells for hydrocarbon recovery, the subterranean formation is evaluated. Based on this evaluation, the location and trajectory of at least a portion of the wellbore may be selected, e.g., to manage risk, enhance production economics, etc. Multi-domain technology, such as inversion geophysics, petroleum systems modeling, reservoir characterization, fracture geomechanics, and production stimulation are sometimes employed in such evaluations.

In an unconventional hydrocarbon system, shale may act as both the source and the reservoir for the hydrocarbons. Various geological, geochemical, and petrophysical studies may reveal a combination of characteristics that assist in the identification of drilling sites or "sweet spots" in such shale. However, due to a lack of integrated, multi-domain technology techniques, a well drilled in a shale reservoir can end up producing little or no hydrocarbons, or can have a rapidly declining rate of hydrocarbon production.

SUMMARY

Embodiments of the disclosure may provide a method for determining a potential drilling location. The method includes obtaining data representing a subterranean domain, the data including at least seismic data, inverting the seismic data, creating a petroleum systems model of the subterranean domain based at least in part on a result of inverting the seismic data, simulating a dynamic reservoir model of the subterranean domain based at least in part on the petroleum systems model, and identifying the potential drilling location based on a combination of the inverting of the seismic data, creating the petroleum systems model, and simulating the dynamic reservoir model.

In some embodiments, inverting the seismic data includes determining total organic content in the subterranean domain, and identifying a first sweet spot based on the determined total organic content.

In some embodiments, creating the petroleum systems model includes creating three-dimensional geological model of the subterranean domain, generating a facies model of the subterranean domain, simulating the petroleum systems model on a geological time-scale to determine rock maturity in the subterranean domain, and identifying a second sweet spot based on the determined rock maturity.

In some embodiments, simulating the dynamic reservoir model includes simulating fluid flow in the subterranean domain to an end of history, and determining a third sweet spot based on an untapped hydrocarbon pore volume in the subterranean domain at the end of history.

In some embodiments, the method also includes constructing a discrete fracture model of the subterranean domain to predict the fluid flow therein.

In some embodiments, identifying the potential drilling location includes comparing sweet spots determined by the inverting, the constructing, and the simulating.

In some embodiments, the method further includes designing a hydraulic fracture operation using a well drilled at the potential drilling location in the subterranean domain by constructing a discrete fracture network model of the subterranean domain.

Embodiments of the disclosure may also provide a computing system. The computing system includes one or more processors, and a memory system including one or more non-transitory computer-readable media storing instructions that, when executed by at least one of the one or more processors, cause the computing system to perform operations. The operations include obtaining data representing a subterranean domain, the data including at least seismic data, inverting the seismic data, creating a petroleum systems model of the subterranean domain based at least in part on a result of inverting the seismic data, simulating a dynamic reservoir model of the subterranean domain based at least in part on the petroleum systems model, and identifying the potential drilling location based on a combination of the inverting of the seismic data, creating the petroleum systems model, and simulating the dynamic reservoir model.

Embodiments of the disclosure may further provide a non-transitory computer-readable medium storing instructions that, when executed by one or more processors of a computing system, cause the computing system to perform operations. The operations include obtaining data representing a subterranean domain, the data including at least seismic data, inverting the seismic data, creating a petroleum systems model of the subterranean domain based at least in part on a result of inverting the seismic data, simulating a dynamic reservoir model of the subterranean domain based at least in part on the petroleum systems model, and identifying the potential drilling location based on a combination of the inverting of the seismic data, creating the petroleum systems model, and simulating the dynamic reservoir model.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

Figure 1:
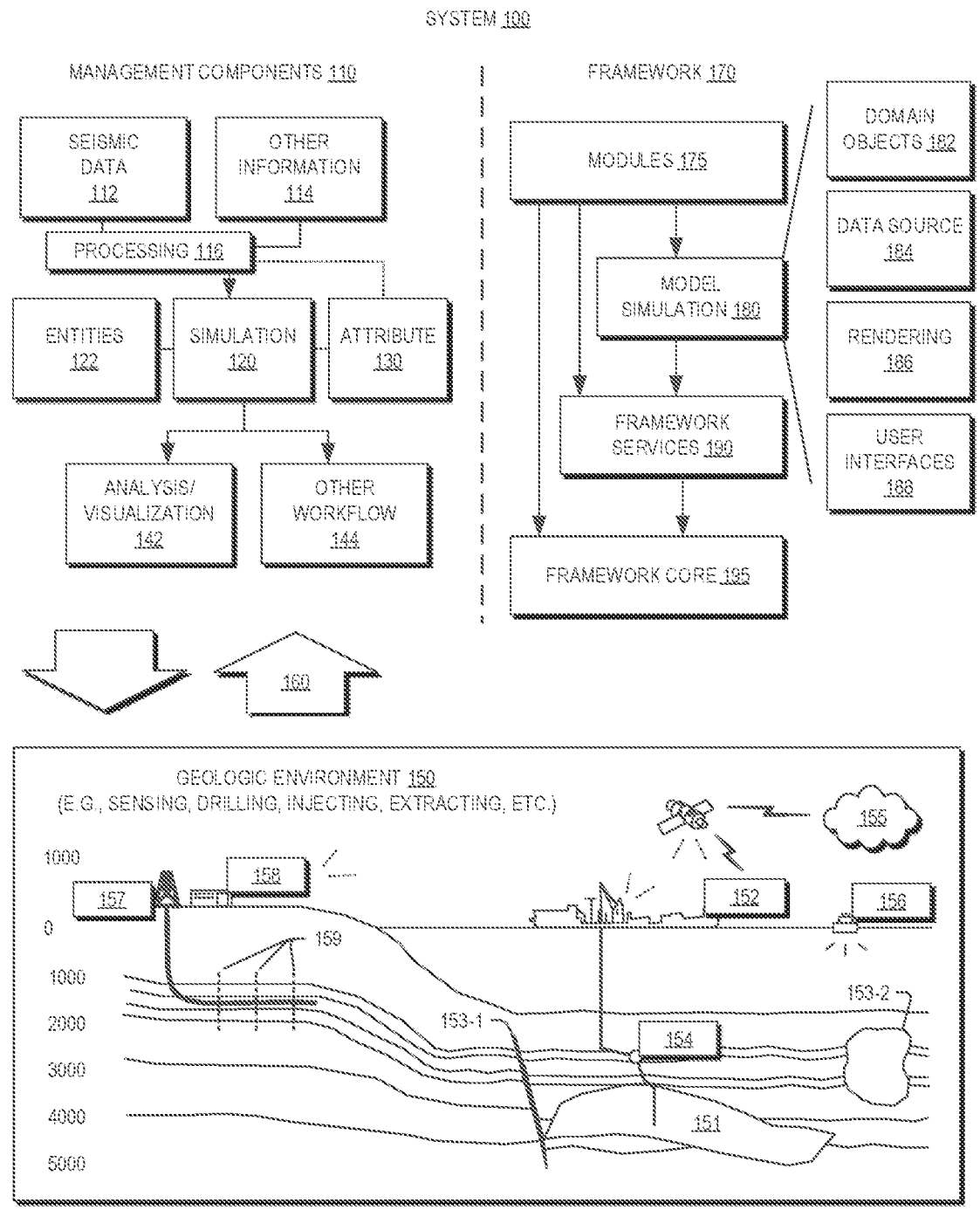
FIG. 1 illustrates an example of a system that includes various management components to manage various aspects of a geologic environment, according to an embodiment.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET® framework (Redmond, Wash.), which provides a set of extensible object classes. In the .NET® framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Tex.), the INTERSECT™ reservoir simulator (Schlumberger Limited, Houston Tex.), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Tex.) allows for integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Figure 2:
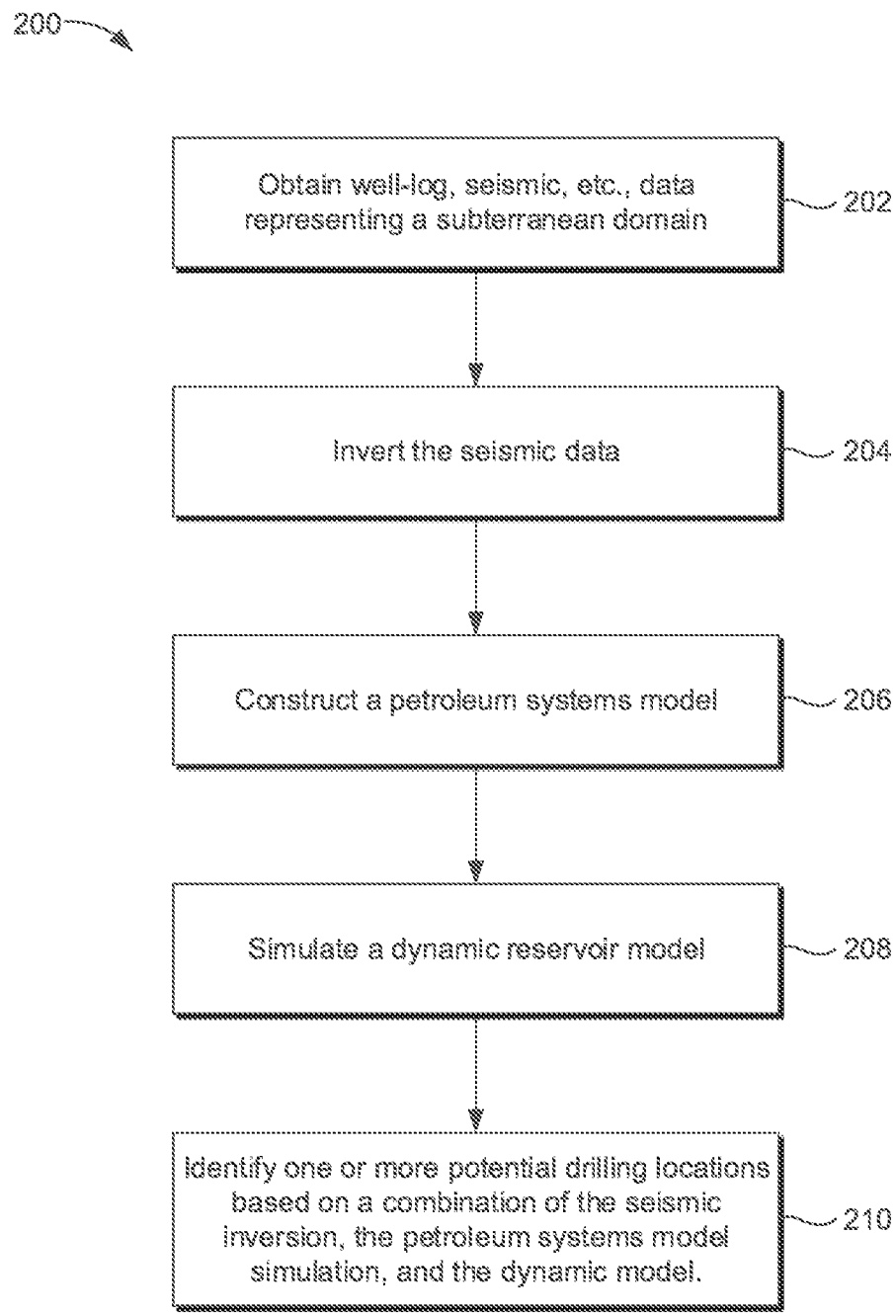
FIG. 2 illustrates a flowchart of a method for determining potential drilling locations, according to an embodiment.

FIG. 2 illustrates a flowchart of a method 200 for identifying drilling locations within a subterranean domain, according to an embodiment. The method 200 may begin, for example, by obtaining data collected from and representing the subterranean domain, as at 202. The data may be well-log data, such as data collected using logging equipment deployed at least partially into a wellbore (e.g., a pilot well, a partially constructed injection or production well, etc.). The data may also be seismic data, which may be collected using a seismic receiver (e.g., a geophone or a hydrophone) that may record seismic waves propagated from a source, through the subterranean domain, and reflected from reflective rock interfaces. A variety of other data collection activities may be conducted as part of the method 200. In some embodiments, "obtaining" such data may refer to accessing information stored on a computer-readable medium, but in other embodiments, "obtaining" may refer to the physical collection of the data in the field.

The method 200 may also include inverting seismic data to identify one or more potential drilling locations, as at 204. This may begin with the determination of elastic and mechanical properties from the well-log using a rock-physics study. By cross-plotting these properties, zones within a shale reservoir may be identified that have a high total organic content (TOC), high velocity anisotropy, a good brittleness zone for better "fraccability," etc. These characteristics, e.g., including the TOC, may allow for an identification of potential drilling locations.

Further, pre-stack seismic inversion may be used to compute elastic and mechanical attributes for the shale reservoir zone. The model-based inversion is used to compute P-reflectivity, P-S wave velocity ratio (Vp/Vs), and density, which depends on the quality of input data as well as the presence of long offsets. Rock mechanical properties such as Poisson's ratio (PR), Young's modulus (YM), and brittleness index (BI) of a rock formation are estimated from the computed inversion properties at the zone of interest.

Next, the method 200 may include constructing a petroleum systems model of the subterranean domain, as at 206. Based on the petroleum systems model, the potential drilling locations from the seismic inversion may be validated and/or separate potential drilling locations may be identified. In order to construct the petroleum systems model, a three-dimensional geological model is first created. The inputs for the geological model may include those characteristics derived using seismic inversion, as well as data obtained at 202.

More particularly, in an embodiment, the geological model represents stratigraphic and geological layers, encompassing overburden (above the reservoir) to basement (below the reservoir). Once this 3D model is constructed, the results of the seismic inversion of block 204 (e.g., P-reflectivity, Vp/Vs, Density) may be populated in the model. These values (which may be upscaled) may be employed to model litho-facies. Once the litho-facies are defined for the zone of interest, geochemical property related to the TOC may also be populated Once the 3D model is populated with litho-facies and TOC distribution in the shale reservoir, the 3D model may then be converted to a petroleum system model, in which the other formations from overburden to basement may be assigned with different properties derived from geological and geochemical interpretations. The petroleum systems model may then be simulated in geological time scale to predict the temperature, pore pressure, over pressured zones, source rock maturity, hydrocarbon generation, adsorption, and retention within the shale. Calibration of pressure, temperature, and maturity is performed, based on observed values recorded at the well locations. This increases confidence of petroleum system derived parameters, which are then further used for prediction of different geomechanical properties. The predicted geomechanical properties includes coupling of sedimentation, compaction, pore fluid pressures, permeability change and hydrocarbon generation pressures to compute properties like stresses, strain and their trajectories for entire 3D model, through geological time.

After the calibrated petroleum system model is generated, it is then further modeled with the petrophysical properties (e.g., porosity, permeability, and water saturation) for the shale reservoir zone. Then, the petroleum systems model is upscaled with geomechanical properties such as Poisson's ratio (PR), Young's modulus (YM), and brittleness index (BI) for the shale reservoir. Further, fracture induced porosity and permeability is incorporated within the previously built 3D model to prepare the dual porosity and dual permeability model by performing discreet fracture network (DFN) modeling.

The petroleum systems model may generally represent the subterranean domain statically, i.e., under equilibrium conditions. To represent the subterranean domain dynamically, the method 200 may also include simulating a dynamic reservoir model, e.g., based on the petroleum systems model and/or the 3D geological model, as at 206. Such a dynamic model simulates fluid flow in the subterranean domain; however, in the case of unconventional wells, the subterranean domain is generally hydraulically fractured to facilitate such fluid flow. Accordingly, in order to accurately model fluid flow, such hydraulic fractures are accounted for by way of generating a hydraulic fracture model of the subterranean domain.

In particular, an unconventional fracture model (UFM) may be created at the potential drilling locations/sweet spots identified at 204 and/or 206 (or others) to design a hydraulic fracturing operation. Knowledge of in-situ stress obtained from the geomechanical model and the pre-existing natural fracture network obtained from the seismic inversion may be aligned with fracture job parameters (e.g., proppant size, proppant mass, pumped volume, etc.) to design the hydraulic fracture operation. In UFM, the hydraulic fracture network changes from complex network near the well to simple linear fracture and further extension to the reservoir with the increase of stress contrast. This enables simulation of the fracture propagation, fluid flow and proppant transport in a complex network of fractures.

The results of the dynamic modeling, e.g., when the model advances to the end of history (i.e., present day), may include an identification of locations with remaining reserves of hydrocarbon. These may be identified as potential drilling locations. The identified drilling locations derived from the seismic inversion at 204, the petroleum system simulation at 206, and the dynamic modeling at 208 may be integrated, as at 210. For example, the locations of the identified drilling locations may be compared, so as to determine which of the locations are corroborated by the different techniques. Based on such identification, the basic trajectory of the well may be designed.

Once the well design is prepared, processes of reservoir simulation, pressure, and production profiles for the upcoming years, and/or other characteristics may be forecasted. This production profile along with capital and operating expense forecasts may be used to carry out an economic analysis and generate sensitivities on the same. On the basis on economics, profitability may be evaluated.

Figure 3A:
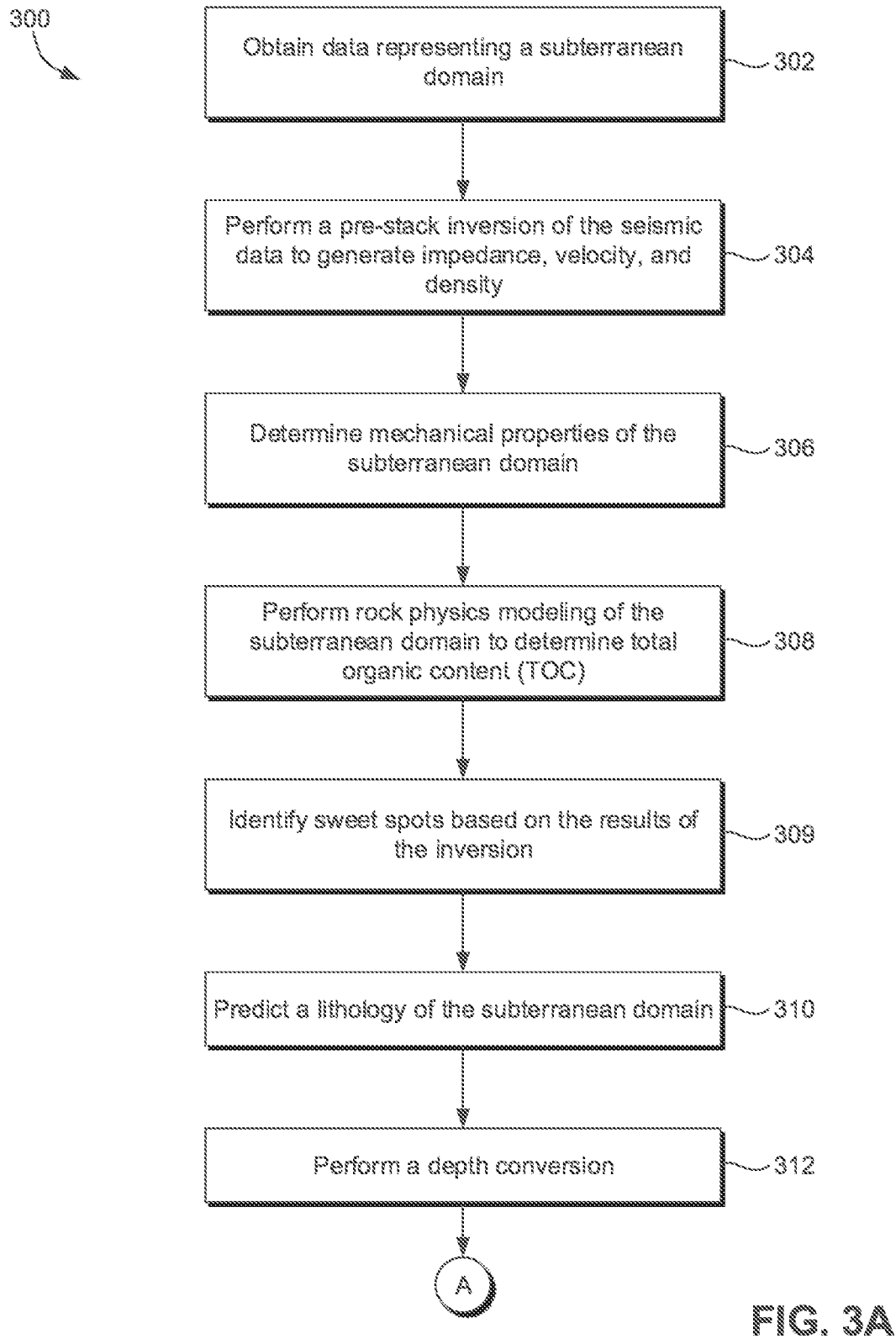
FIGS. 3A, 3B, and 3C illustrate a flowchart of a method for determining potential drilling locations, according to an embodiment.
Figure 3B:
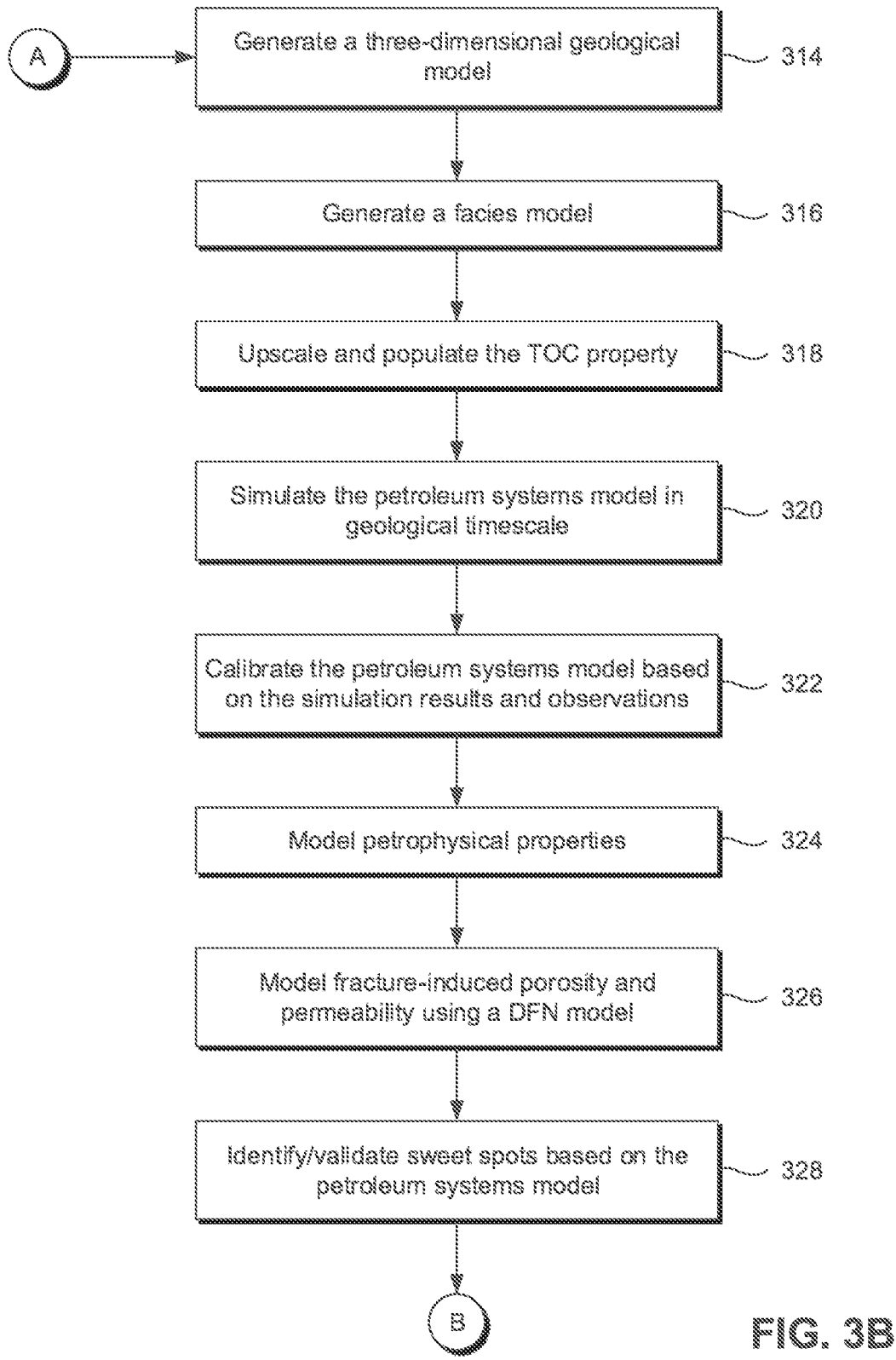
Figure 3C:
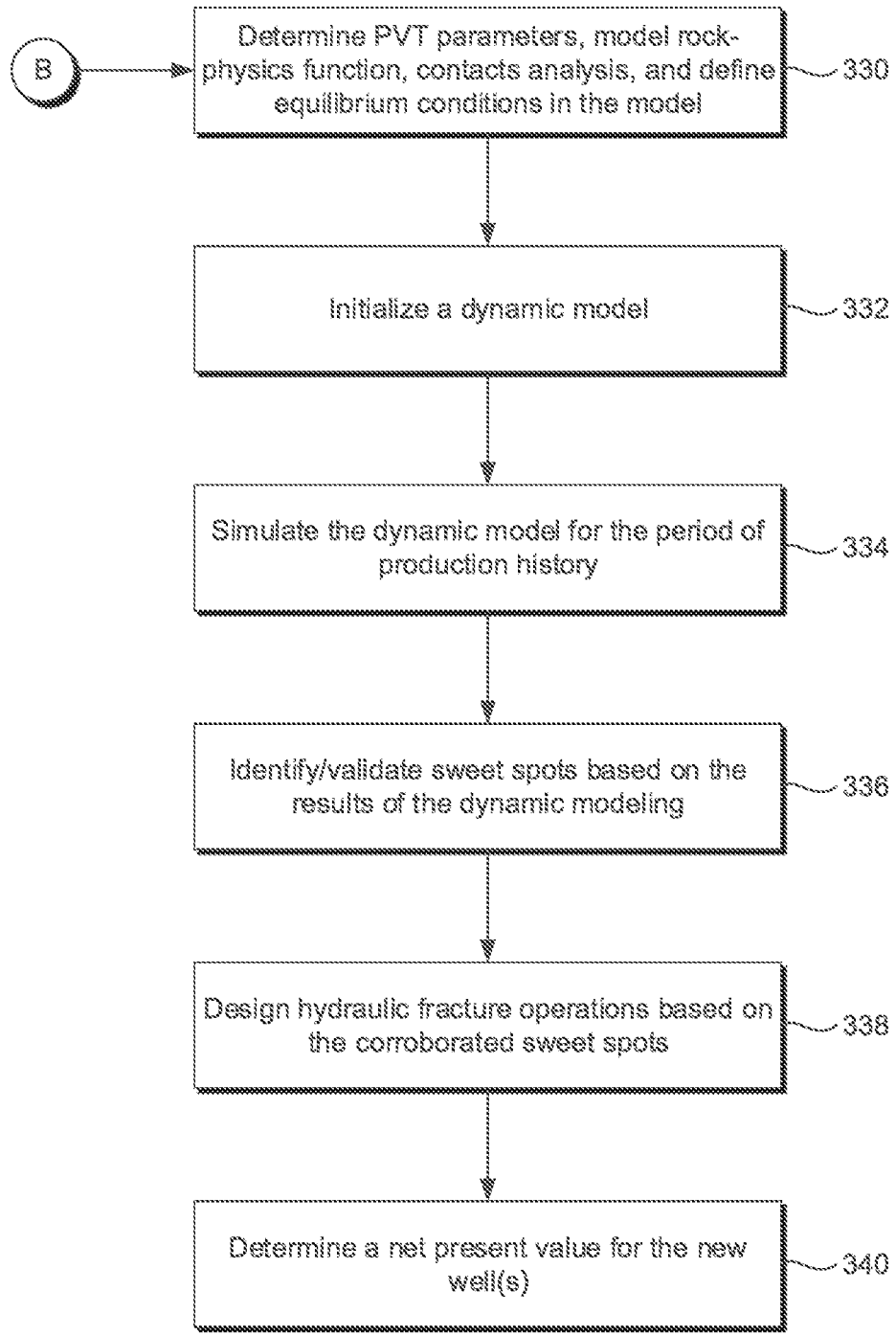

FIGS. 3A-3C illustrate a flowchart of a method 300 for determining a drilling location, according to an embodiment. In particular, the method 300 may be an embodiment of the method 200, explained in greater detail. The method 300 may begin by obtaining a well-log, seismic, and/or other data from a subterranean domain, as at 302.

Seismic Inversion to Determine Sweet Spots

The method 300 may then proceed to performing a pre-stack inversion of the seismic data to determine impedance, velocity, and density of the subterranean domain, as at 304. In particular, the pre-stack inversion may be a pre-stack simultaneous amplitude versus offset (AVO) inversion study to highlight areas exhibiting seismic velocity anisotropy in shale of the subterranean domain.

Briefly, when a seismic wave encounters a boundary between two materials with different physical properties, some of the energy in the wave is reflected at the boundary, while some of the energy propagates through the boundary.

The proportion of the energy reflected is a result of the property (impedance) contrast at the boundary. The reflected energy also varies with the angle at which the wave hits the interface. Reflections of different angles hit receivers located at different distances from the source.

A seismic gather is the collection of the reflected signals generated from one location that have hit the receivers at different angles. Stacking is a process whereby the correctly time-aligned signals are added together so as to improve signal quality. The signals hitting one location in the subsurface are stacked together to form a "full stack." Further, subsets of the signals, representing different reflection angles, can be stacked into "angle stacks" or "offset stacks." Signals reflected at small angles are recorded at small offsets and are stacked into a "near stack" volume. Similarly, a "far stack" volume is made from the large angle reflections. The amplitude of the reflection may vary with reflection angle, and the change in amplitude (from near stack to far stack or along a seismic gather) is called AVO or "amplitude versus angle" (AVA). The AVO study may be different for certain rock types and fluids. Further, prior to inversion, tests may be conducted using the partial stacking data of the subterranean domain, e.g., for different angles in order to determine parameters of the absolute inversion.

The gathers (i.e., records of the seismic receives) may be conditioned for input for the pre-stack simultaneous inversion. The conditioning workflow is included in move-out correction, statics-based event flattening and trace balancing. Prediction of low-frequency inversion attribute trends (P-impedance (AI), P-S wave velocity (Vp/Vs) ratio and density) are accomplished by extrapolating these attributes from well data following variations in a high-resolution velocity model (if available). An inversion wavelet may be estimated independently for each of the angle stacks using a well log reference. The waveforms, phase, and bandwidths are similar except for some detailed differences in the side lobe energy.

The method 300 may include determining mechanical properties of the subterranean domain, as at 306. The inversion attribute constraints are determined for matching AI, Vp/Vs, and density simultaneously. With the help of the seismic inversion output (i.e. Vp/Vs ratio, AI, and density), Poisson's ratio (PR), Young's modulus (YM), and brittleness index (BI) for the shale reservoir are calculated and also calibrated at well level. Comparisons of Young's modulus and Poisson's ratio are used to distinguish brittle from ductile rock, which is valuable when completion intervals are being chosen.

$$BI = \left[\left\{\frac{YM1}{7}\right\} + \left\{\frac{PR0.4}{0.25}\right\}\right] \cdot 50 \quad (1)$$

$$YM = \frac{(RHOB)V_s^2(3V_p^2 4V_s^2)}{(V_p^2 V_s^2)} \quad (2)$$

$$PR = \frac{(V_p^2 V_s^2)}{2(V_p^2 V_s^2)} \quad (3)$$

The method 300 may include performing rock-physics modeling of the subterranean domain to determine total organic content, as at 308. The presence of candidate source rock as defined by total organic content (TOC) may facilitate delineating the prospective hydrocarbon zones over the subterranean domain. Rock physics models provide links between microscopic rock properties and macroscopic physical characteristics, such as seismic velocity and resistivity, and the basis for predicting rock/fluid properties from geophysical data. TOC influences the properties of shale gas because it is indicative of gas-production potential, and because of its velocity, density, and resistivity characteristics. Organic matter differs from fluid in that it is solid-like material with non-zero bulk and shear moduli, while fluids typically do not resist shear deformation.

Rock physic models connect the seismic inversion attributes and rock physical properties. Through the combination of different elastic parameters and the cross-plots calibrated by different logging interpretation in the interval as compared to the target interval, the shale with higher TOC shows low density, low P-S wave velocity ratio, low P-wave impedance, and low Poisson's ratio; the tight shale shows high density, high P-wave and S-wave velocity ratio, medium p-wave impedance and high Poisson's ratio. Properties such as Young's modulus, brittleness index and Poisson's ratio provide information for facies identification, mineral content, and rock strength. From these, drilling locations or "sweet spots" may be determined, as at 309, in areas having high TOC, low Poisson's ratio and high brittleness index, which may indicate the primary, more siliceous, relatively more porous, gas-charged sweet spots.

The method 300 may include predicting a lithology of the subterranean domain in the model, based in part on the seismic inversion, as at 310. Predicting lithology from inversion results facilitates understanding the probability of occurrence of each facies types of the reservoir. It is started with establishing a probability density function using the elastic parameters of acoustic impedance (AI), VP/VS, and density by logging lithology curve and data at well level. Next, the probability density function is applied to the inverted seismic output, such as AI, P-S wave velocity ratio, density volumes to generate the probability density distribution, maximum probability distribution and the prediction results of each lithological body. These results may be used during the population of facies in a 3D geo-cellular model at a later stage.

A velocity model may be prepared by integrating well and available seismic velocities. The interpreted surfaces (major geological boundaries), inverted volumes (Vp/Vs ratio, AI and density), TOC, and lithology probability volumes may initially be determined above in the time domain. For incorporation into the models going forward, these attributes are converted into depth domain from time domain, as at 312.

Petroleum Systems Modeling to Determine Sweet Spots

Figure 4:
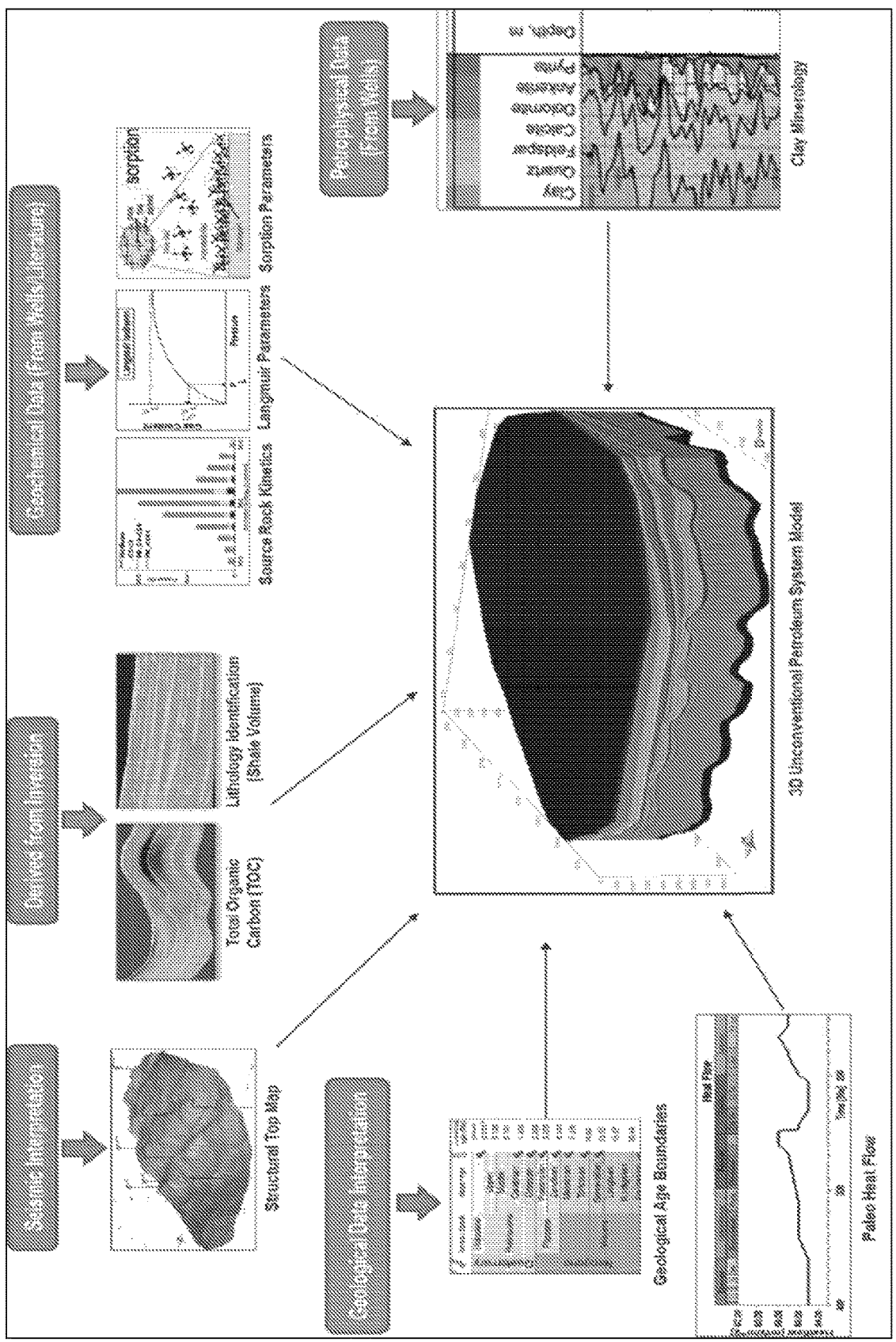
FIG. 4 illustrates components of a petroleum systems model, according to an embodiment.

The method 300 may then move to the second aspect: simulating a petroleum systems model to determine second sweet spots. In this aspect, the method 300 may generate a three-dimensional geological model, as at 314, based on the attributes and characteristics determined earlier. In particular, after seismic inversion and a rock physics study, a 3D geo-cellular model (e.g., in the depth domain) may be generated for the subterranean domain by integrating geological, geochemical, and petrophysical data, and results derived from geophysical inversion studies. FIG. 4 illustrates a graphical representation of the various inputs that may go into such a model, e.g., a 3D unconventional petroleum systems model. Such model may be employed to build a comprehensive static 3D reservoir model of shale reservoir that represents the heterogeneities encountered at the well level. Static reservoir modeling may integrate the relevant data, spanning from core to conceptual geological model, into a coherent and meaningful reservoir description for the shale reservoirs. This reservoir description may serve as a deterministic basis for volumetric estimation and history matching.

Generating the 3D geological model may include preparing a geological grid by incorporating major formation boundaries (from overburden to basement) in the subterranean domain. The shale reservoir in the model may then refined further into appropriate layers to capture the vertical heterogeneity.

The method 300 may also include generating a facies model, as at 316. Litho-facies may indicate ecstatic changes during deposition and are geo-markers related to the preservation and amount of accumulated TOC for a given basin. Petrophysical properties and gas content are related to TOC and vary according to litho-facies. Based on the mineralogical and TOC content, some litho-facies are favorable for gas production (e.g., siliceous litho-facies). A shale gas facies system may be interpreted in the reservoir zone at well level (1D), incorporating an integrated petrophysical approach for characterizing shale gas reservoirs utilizing elastic logs (AI, Vp/Vs) and mechanical property log (TOC, Poisson's ratio, Porosity, density) measurements. For example, an integrated 3D facies modeling approach may be employed, considering the interpreted litho-facies logs and the depth converted probability density distribution volumes from the previously done lithology prediction study. The 3D litho-facies model, however, may provide a quick and accurate method of classifying shale reservoirs and identification of favorable zones for performing hydraulic fracturing of reservoirs. The depth-converted TOC is upscaled/populated into the 3D geo-cellular model, as at 318. The TOC property may be upscaled for population in the facies model, as at 318.

Thus, combining different results from previously performed inversion studies and interpretation results from various domains, as depicted in FIG. 4, yields a 3D unconventional petroleum system model. The unconventional petroleum systems model may be simulated in geological timescale, as at 320, to understand the process of temperature, pressure, over pressure zones, source rock maturity, hydrocarbon generation, retention, adsorption and related stresses within the organic rich shale units. The initial results obtained after the simulation are analyzed and calibrated with observations of measured temperature, maturity, and pore pressures values to further quantify the numerical results, as at 322. Thermal and pressure calibration may also be employed in order to increase confidence in the modeled results, obtained after running the simulation of unconventional petroleum system model (described below).

After initial calibration of modeled temperature, maturity, and pressure values, other results like hydrocarbon generation and retention may be analyzed. One analysis offered by performing petroleum system modeling is the identification of regions which are more prone to have oil or gas retained within the shales reservoirs. The main zones in shale reservoirs are delineated to locate the areas which are predicted to have high saturated of oil/gas.

Figure 5:
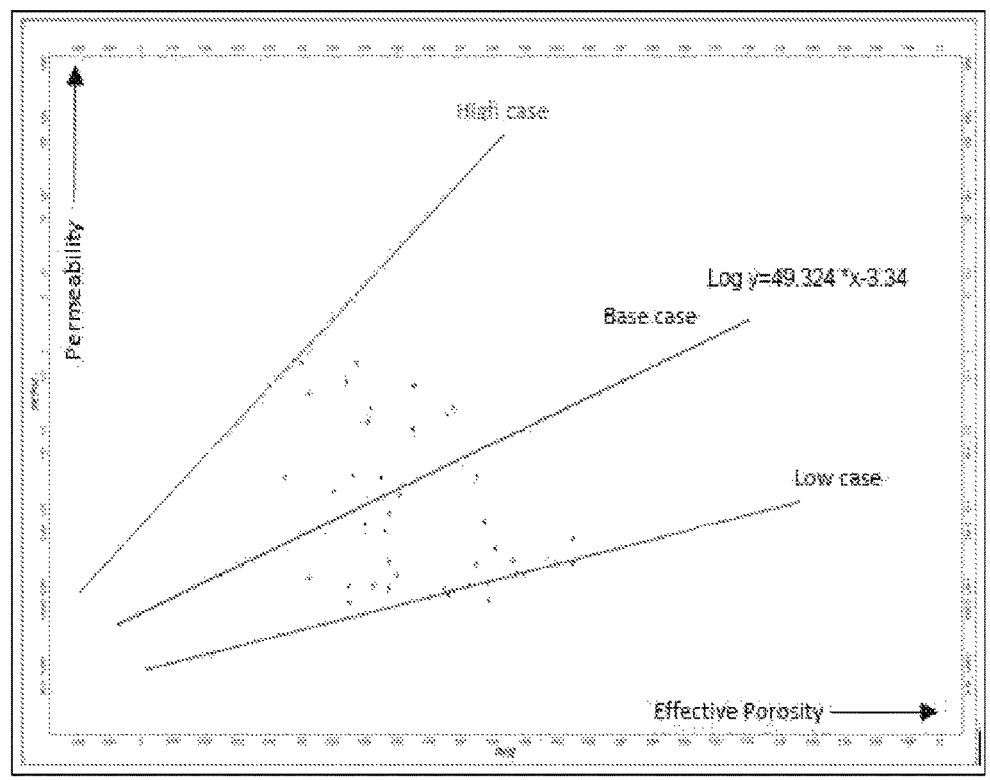
FIG. 5 illustrates a plot of porosity and permeability for a shale reservoir zone, according to an embodiment.

Next, the method 300 may include modeling petrophysical properties (matrix porosity, matrix permeability, and water saturation), as at 324. The inputs to property modeling at 324 include core information and petrophysical interpretation. Population of porosity (Φ) in the petroleum systems model may be conditioned with the facies model. Shale reservoirs have low matrix porosity (2%-10%). Further, predicting permeability from porosity in shale gas reservoirs using porosity-permeability cross-plots may be challenging, because large porosity variations may be observed for the little change in permeability value. Accordingly, three relationships (high case, base case, and low case) between porosity and permeability may be established from the porosity and permeability cross-plot for shale reservoir zone, as shown in FIG. 5. The low and high are considered bounding cases, with the mid or "base" case being, on average, the most accurate. Based on the transform function, permeability values may be modeled into a 3D model. Further, water saturation (Sw) defines the fraction of the pore space that is filled with water, often the residual or irreducible reservoir water saturation in the natural fracture and matrix porosity of the shale. A 3D water saturation model is prepared from the processed logs which are available at well level.

Next, fracture-induced porosity and permeability may be represented within the 3D model using a discrete fracture network (DFN) model, as at 326. Matrix permeability in shale gas reservoirs is in the nano-Darcy range; therefore, gas generally cannot be produced without connected fractures (or surface area) inside the reservoir. Natural fractures are often found in shale gas reservoirs, but are usually filled by minerals. Hydraulic fractures can open the minerals filled natural fractures and form a complicated fracture network, which controls the well production and performance. As a result, the extension of hydraulic fracture network and fracture conductivity are factors to build an accurate reservoir model and predict gas production.

Accordingly, a component of this geocellular modeling phase may be preparing a DFN model, which, in addition to providing estimates of the resource potential, supplies the basis for the subsequent planning and execution of drilling, completion and stimulation, and field development planning. The DFN approach can be defined as a modeling and analysis technique that explicitly incorporates the geometry and properties of discrete fractures as a central component controlling flow and transport. DFN models also incorporate the properties of the matrix system, which, in shale gas, provides most of the gas content in the form of free and adsorbed gas (dual porosity/dual permeability model).

Constructing a DFN model generally includes characterization of features such as large scale faults derived from seismic data, identification of smaller-scale features such as sub-seismic faulting/fracturing and joint sets, and statistical modeling of the various fracture sets derived from the analysis of outcrop, cores, and image data. In some embodiments, building a DFN model includes estimating the properties associated with each of the fracture sets observed in the data, including static properties, such as size and aperture distribution, dip and dip azimuth distribution and density, and dynamic properties, such as the effective permeability (permeability tensor). Several sources of information may be employed for this purpose, e.g., through direct measurement (formation images, cores, outcrops) and/or indirect measurements, such as seismic attributes ("Ant Tracking," which provides effective delineation of areas with open fractures, and areas with faulting), petrophysical logs, and dynamic data. As such, the DFN model represents a comprehensive and consistent characterization of the subterranean, incorporating all static and dynamic available information.

Net pay cut-offs are quantitative values of parametric discriminators that define the ranges of values over which a host rock has desired reservoir properties and contains sufficient hydrocarbons to be of potential economic interest. They are applied to well logs after having been quantified using core data. Such core analysis may be conducted on data that has been upscaled to the well-log scale. Otherwise the empirical cut-offs may turn out to be inappropriate. Cut-offs are data-driven, and, therefore, they can vary in response to changes in rock character. Thus, different sets of cut-offs can apply to different geological/petrophysical zones or to diverse partitioned datasets. Cut-offs can be classified as "less than" or "greater-than-or-equal-to" cut-offs according to the discriminator used.

For shale-gas reservoirs, a cut-off through TOC may be established in which kerogen is present in supra-critical concentrations. If TOC is zero, kerogen content may be zero, and net pay may be set at zero. Next, kerogen-bearing intervals/zones that may be usefully fractured based on high brittleness and guided by natural fracture density may be identified. Further, intervals/zones that have a functional porosity, e.g., tied back to permeability, to reflect the storage and transmissivity character of a reservoir rock may be identified. Finally, the presence of a supra-critical gas saturation may be determined from resistivity and/or other logs such as magnetic resonance imagers.

If $\{(\Phi \geq \Phi\ min)$ and $(Sw \leq Sw\ max)$ and $(TOC \leq TOCmin)$ and $(BI \geq BI\ min)\}$ Then (NTG) is 1 else 0

Where,

Sw max=Maximum water saturation determined at well logs

TOCmin=Minimum Total Organic Content determined from Core data $\Phi$ min=Minimum effective porosity determined at well logs BImin=Minimum Brittleness Index determined at well logs After deriving the NTG at well level the equation is applied in 3D model in the shale reservoir zone to prepare a 3D NTG property.

In order to locate the sweet spots for probable drilling locations in the shale reservoirs, low Poisson's ratio, high TOC, high rock brittleness index, presence of natural fractures, and estimation of rock geomechanical properties are determined within the zone of interest.

Shale gas reserves may then be estimated. The gas occurs inside a shale reservoir in the form of free gas and adsorbed gas. The calculation of free gas in-place for a given areal extent (acre, square mile) is governed, at least partially, by four characteristics of the shale formation, pressure, temperature, gas-filled porosity and net organically-rich shale thickness respectively. The calculation of free gas in place (free GIP) uses the following reservoir engineering equation:

$$GIP=[Bulk\ Volume*NTG*(\Phi Matrix+\Phi Fracture)*Sg/(Bg)$$

Where, $$Bg=(0.02829zT)/P$$

Bg is the gas volume factor, in cubic feet per standard cubic feet and includes the gas deviation factor (z), a dimensionless fraction. (The gas deviation factor (z) adjusts the ideal compressibility (PVT) factor to account for non-ideal PVT behavior of the gas). $\Phi$ Matrix is effective porosity, a dimensionless fraction and will be obtained from previously performed 3D geo-cellular model. $\Phi$ Fracture is fracture porosity, a dimensionless fraction and will be obtained from previously performed DFN model. Sg is the fraction of the porosity filled by gas (1−Sw) instead of water (SW) or oil (So), a dimensionless fraction. P is pressure, in psi (pressure data is obtained from well test information, inferred from mud weights used to drill through the shale sequence. Basins with normal reservoir pressure are assigned a conservative hydrostatic gradient of 0.433 psi per foot of depth; basins with indicated overpressure are assigned pressure gradients of 0.5 to 0.6 psi per foot of depth; basins with indicated under pressure are assigned pressure gradients of 0.35 to 0.4 psi per foot of depth). T is temperature, in degrees Rankin (temperature data is obtained from well test information or from regional temperature versus depth gradients; the factor 460 degree F. is added to the reservoir temperature (in F) to provide the input value for the gas volume factor (Bg) equation).

In addition to free gas, shales can hold gas adsorbed on the surface of the organics (and clays) in the shale formation. A Langmuir isotherm is established for the prospective area of the basin using available data on TOC and on thermal maturity to establish the Langmuir volume (VL) and the Langmuir pressure (PL). Adsorbed gas in-place is then calculated using the formula (where P is original reservoir pressure): $G_c=(V_L*P)/(P_L+P)$.

The above gas content ($G_c$) (which may be measured as cubic feet of gas per ton of net shale) is converted to gas concentration (adsorbed GIP per square mile) using actual or estimated values for shale density. (Density values for shale may be in the range of 2.65 gm/cc and depend on the mineralogy and organic content of the shale.)

The estimates of the Langmuir value ($V_L$) and pressure ($P_L$) for adsorbed gas in-place calculations are based on either publically-available data in the technical literature or internal (proprietary) data. In general, the Langmuir volume ($V_L$) is a function of the organic richness and thermal maturity of the shale. The Langmuir pressure ($P_L$) is a function of how readily the adsorbed gas on the organics in the shale matrix is released as a function of a finite decrease in pressure.

The results derived from petroleum system modeling and inversion related studies may then be combined to delineate the sweet spots in the area of interest for the shale reservoir zone, as at 328.

Dynamic Modeling to Identify Sweet Spots

Figure 6:
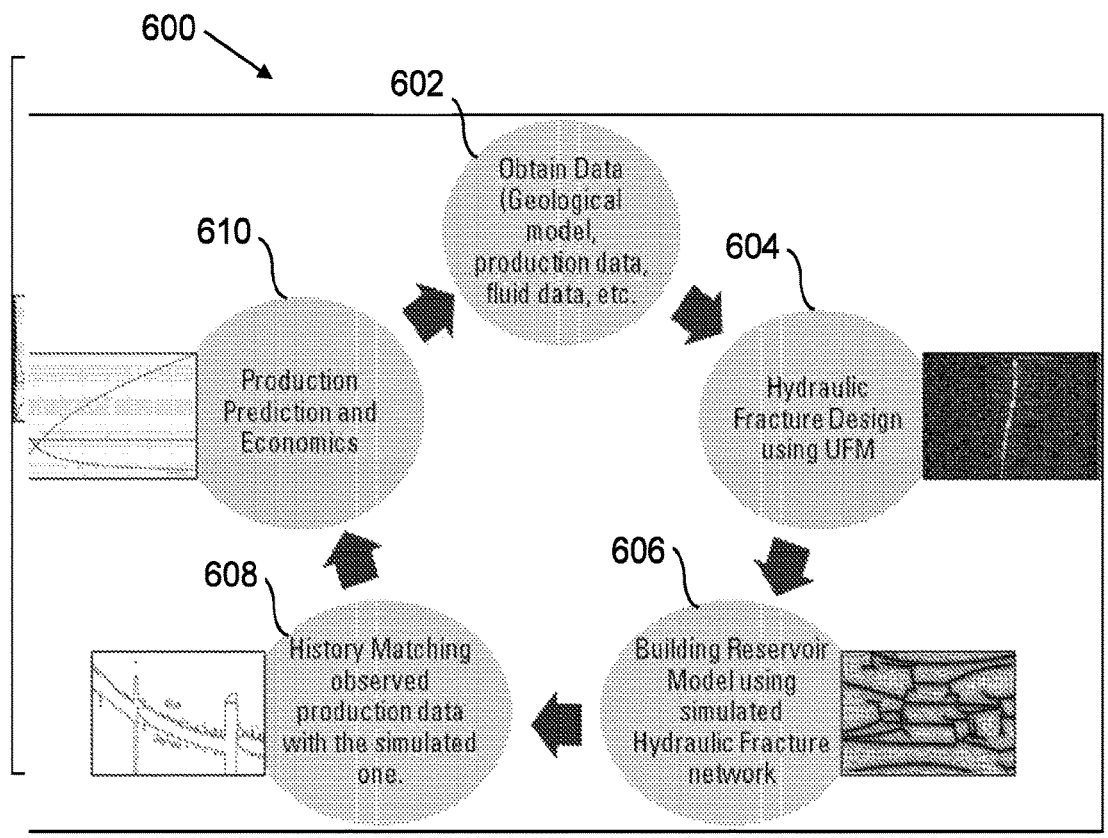
FIG. 6 illustrates a flowchart of a dynamic modeling workflow, according to an embodiment.

Dynamic modeling may proceed generally as shown in FIG. 6, generally indicated by reference number 600. Dynamic modeling 600 may include obtaining the data, such as a geological model (e.g., the geo-cellular model containing the natural fracture network and petrophysical properties calculated with basin modeling), as at 602. The dynamic modeling 600 may then proceed to hydraulic fracture design using unconventional fracture modeling (UFM), as at 604. The dynamic modeling 600 may also include building a reservoir model using a simulated fracture network, as at 606. The dynamic modeling 600 may then history match observed production data with the simulated data, as at 608. The dynamic modeling 600 may then predict production and conduct an economic analysis, as at 610, which may return the workflow to 602.

More particularly, referring again to FIG. 3C, the process of dynamic modeling starts with classical reservoir engineering tasks, as at 330. These involve PVT modeling, rock physics function modeling, contacts analysis and definition of equilibrium condition. In the case of unconventionals (e.g., shale), this may also involve defining adsorption isotherms to compute adsorbed and free hydrocarbon volume.

With the classical reservoir engineering inputs to the geocellular model, dynamic initialization is carried out, as at 332. The initialization generates in-place volumes which are compared against the volumes obtained from volumetric computation in geo-cellular model. If the difference between the two volumes is within a predetermined range, the initialization may be considered valid to proceed further.

The model is then simulated for the period of production history of the field to replicate the observed pressure and production data. Suitable adjustments in geological properties and reservoir engineering inputs are made to match the observed history.

In the case of shale reservoir, existing wells in the field have hydraulic fractures and therefore, hydraulic fractures may be modeled for accurately matching the history of the field with model response. As hydraulic fractures may open the pre-existing fracture network and propagate along the natural fractures, the orientation and density of natural fractures have impacts on the extension and geometry of hydraulic fractures. Thus, in-situ stress and a pre-existing fracture network are two key factors to control the extension of hydraulic fracture network.

A hydraulic fracture network may be simulated using an Unconventional Fracture Model (UFM) for the wells in a naturally-fractured shale gas reservoir, where the natural fractures are assumed closed or mineral filled. Then the simulated hydraulic fracture network may be exported to build a reservoir model and to simulate the well production.

In order to incorporate hydraulic fractures in the reservoir model, the top and bottom of the reservoir may be used as the top and bottom limits for hydraulic fractures. The geomechanical properties in the reservoir may be extracted from the mechanical earth model. Frocking fluid types, proppant types, volumes and pumping schedules may be estimated. A hydraulic fracture network changes from a complex network near the well to simple linear fracture and further extension to the reservoir with the increase of stress contrast. Therefore, the in-situ stress included in the stimulated reservoir region and volume, which may result in different future well production.

The history-matched (calibrated) reservoir model, incorporating hydraulic fractures, may then be taken forward for predictions. The predictions phase starts with identification of sweet spots for proposing new/infill wells location, which may serve as an identification of sweet spots based on the dynamic modeling, as at 336. For example, the sweet spots identified at 336 may be locations of hydrocarbon pore volume (HCPV) left untapped/bypassed at the end of history (current day). Such identification may be used to validate or "corroborate" the previously-identified sweet spots (based on inversion and/or petroleum systems modeling) or to identify new sweet spots.

Accordingly, embodiments of the present disclosure may provide for predicting the prospective location of new/infill wells using an integration of output of seismic inversion, basin modeling and reservoir engineering. Seismic inversion provides sweet spots from TOC computation; however, there are associated uncertainties in TOC sweet spots of deciding cut-off ranges. These sweet spots may, therefore, be further associated with maturation study, pore-pressure prediction, identification of over-pressured zones, adsorbed and free-hydrocarbon in shale reservoir. Such techniques may be carried out during petroleum systems modeling, which help in delineating TOC sweet spots, to generate more certain sweet spots. Further the calibrated reservoir model may provide sweet spots, in terms of hydrocarbon pore volume (HCPV) left untapped/bypassed at the end of history (current day). The three sets of sweet spots (identified from seismic inversion, petroleum systems modeling and reservoir model) may then be integrated to decide the final sweet spots for future well locations. These sweet spots may, accordingly, be validated based on multiple domains and thus may carry a high degree of confidence.

In case the production history is not available, the sweet spots obtained after dynamic initialization of the model may be associated with the sweet spots from other two domains.

The wells at these locations may be taken forward to design hydraulic fracture operations, as at 338, e.g., using UFM. Finally the designed wells may be incorporated in reservoir model for future pressure-production forecast, estimate ultimate recovery, feasibility of various development scenarios (whichever may be applicable) in the field like waterflood, EOR, etc. The development scenarios may also incorporate various sensitivities on well trajectory, group control, rate control, etc. The simulated production profiles from the scenarios may be undertaken for economic analysis using industry prevalent economic parameters. The net present value (NPV) obtained from economic analysis may be calculated such so as to facilitate selection of scenarios for the development of the field.

Figure 7:
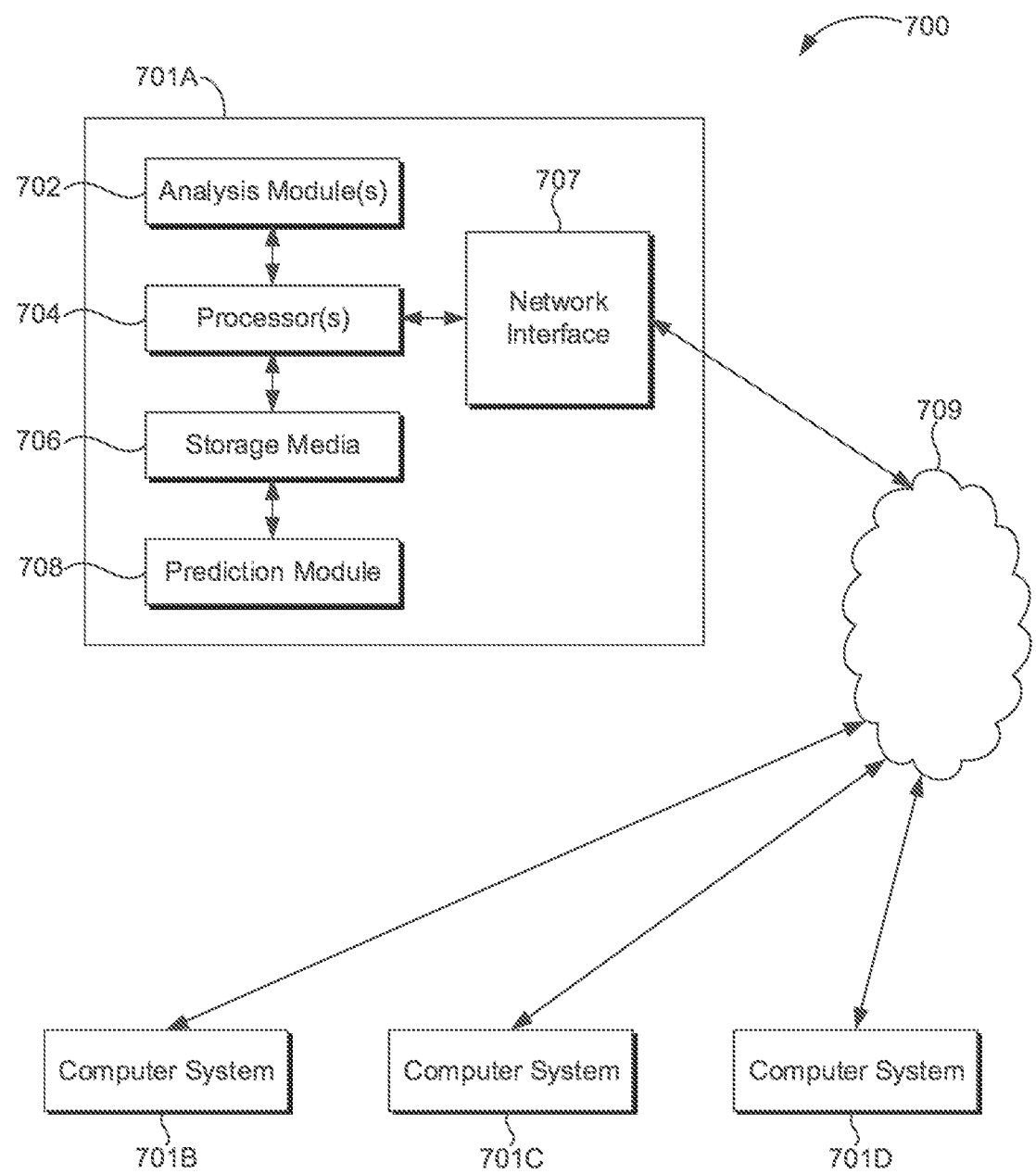
FIG. 7 illustrates a schematic view of a computing system, according to an embodiment.

In some embodiments, the methods of the present disclosure may be executed by a computing system. FIG. 7 illustrates an example of such a computing system 700, in accordance with some embodiments. The computing system 700 may include a computer or computer system 701A, which may be an individual computer system 701A or an arrangement of distributed computer systems. The computer system 701A includes one or more analysis modules 702 that are configured to perform various tasks according to some embodiments, such as one or more methods disclosed herein. To perform these various tasks, the analysis module 702 executes independently, or in coordination with, one or more processors 704, which is (or are) connected to one or more storage media 706. The processor(s) 704 is (or are) also connected to a network interface 707 to allow the computer system 701A to communicate over a data network 709 with one or more additional computer systems and/or computing systems, such as 701B, 701C, and/or 701D (note that computer systems 701B, 701C and/or 701D may or may not share the same architecture as computer system 701A, and may be located in different physical locations, e.g., computer systems 701A and 701B may be located in a processing facility, while in communication with one or more computer systems such as 701C and/or 701D that are located in one or more data centers, and/or located in varying countries on different continents).

A processor may include a microprocessor, microcontroller, processor module or subsystem, programmable integrated circuit, programmable gate array, or another control or computing device.

The storage media 706 may be implemented as one or more computer-readable or machine-readable storage media. Note that while in the example embodiment of FIG. 7 storage media 706 is depicted as within computer system 701A, in some embodiments, storage media 706 may be distributed within and/or across multiple internal and/or external enclosures of computing system 701A and/or additional computing systems. Storage media 706 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 700 contains one or more sweet spot prediction module(s) 708. In the example of computing system 700, computer system 701A includes the sweet spot prediction module 708. In some embodiments, a single sweet spot prediction module may be used to perform some aspects of one or more embodiments of the methods disclosed herein. In other embodiments, a plurality of sweet spot prediction modules may be used to perform some aspects of methods herein.

It should be appreciated that computing system 700 is merely one example of a computing system, and that computing system 700 may have more or fewer components than shown, may combine additional components not depicted in the example embodiment of FIG. 7, and/or computing system 700 may have a different configuration or arrangement of the components depicted in FIG. 7. The various components shown in FIG. 7 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Geologic interpretations, models, and/or other interpretation aids may be refined in an iterative fashion; this concept is applicable to the methods discussed herein. This may include use of feedback loops executed on an algorithmic basis, such as at a computing device (e.g., computing system 700, FIG. 7), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the disclosure and its practical applications, to thereby enable others skilled in the art to best utilize the disclosed embodiments and various embodiments with various modifications as are suited to the particular use contemplated.

What is claimed is:

1. A method for determining a potential drilling location, comprising:
   obtaining data representing a subterranean domain, wherein the data comprises at least seismic data;
   inverting the seismic data, the inverting comprising:
      determining elastic and mechanical properties from a well-log using a rock-physics study,
      cross-plotting the elastic and the mechanical properties,
      identifying, based on the cross-plotting of the elastic and the mechanical properties, zones within a shale reservoir based on total organic content, and
      identifying a first sweet spot based on the identified zones;
   creating a petroleum systems model of the subterranean domain based at least in part on a result of inverting the seismic data, the creating comprising:
      simulating the petroleum systems model on a geological time-scale to determine rock maturity in the subterranean domain, and
      identifying a second sweet spot based on the determined rock maturity;
   simulating a dynamic reservoir model of the subterranean domain based at least in part on the petroleum systems model, the simulating comprising:
      simulating fluid flow in the subterranean domain to an end of history, and
      determining a third sweet spot based on an untapped hydrocarbon pore volume in the subterranean domain at the end of history; and
   identifying the potential drilling location based on a combination of the inverting of the seismic data, the creating the petroleum systems model, and the simulating the dynamic reservoir model to determine which of the first sweet spot, the second sweet spot, and the third sweet spot are corroborated.

2. The method of claim 1, wherein the inverting the seismic data comprises:
   determining the total organic content in the subterranean domain.

3. The method of claim 1, wherein the creating the petroleum systems model comprises:
   creating a three-dimensional geological model of the subterranean domain;
   generating a facies model of the subterranean domain; and
   simulating the petroleum systems model on a geological time-scale to determine the rock maturity in the subterranean domain.

4. The method of claim 1, further comprising constructing a discrete fracture model of the subterranean domain to predict the fluid flow therein.

5. The method of claim 1, wherein:
   the identifying the potential drilling location comprises comparing the first sweet spot, the second sweet spot, and the third sweet spot.

6. The method of claim 1, further comprising designing a hydraulic fracture operation using a well drilled at the potential drilling location in the subterranean domain by constructing a discrete fracture network model of the subterranean domain.

7. A computing system, comprising:
   one or more processors; and
   a memory system comprising one or more non-transitory computer-readable media storing instructions that, when executed by at least one of the one or more processors, cause the computing system to perform operations, the operations comprising:

obtaining data representing a subterranean domain, wherein the data comprises at least seismic data;

inverting the seismic data, the inverting comprising:
 determining elastic and mechanical properties from a well-log using a rock-physics study,
 cross-plotting the elastic and the mechanical properties,
 identifying, based on the cross-plotting of the elastic and the mechanical properties, zones within a shale reservoir based on total organic content, and
 identifying a first sweet spot based on the identified zones;

creating a petroleum systems model of the subterranean domain based at least in part on a result of inverting the seismic data, the creating comprising:
 simulating the petroleum systems model on a geological time-scale to determine rock maturity in the subterranean domain, and
 identifying a second sweet spot based on the determined rock maturity;

simulating a dynamic reservoir model of the subterranean domain based at least in part on the petroleum systems model, the simulating comprising:
 simulating fluid flow in the subterranean domain to an end of history, and
 determining a third sweet spot based on an untapped hydrocarbon pore volume in the subterranean domain at the end of history; and identifying a potential drilling location based on a combination of the inverting of the seismic data, the creating the petroleum systems model, and the simulating the dynamic reservoir model to determine which of the first sweet spot, the second sweet spot, and the third sweet spot are corroborated.

8. The system of claim 7, wherein the inverting the seismic data comprises:
 determining total organic content in the subterranean domain.

9. The system of claim 7, wherein the creating the petroleum systems model comprises:
 creating a three-dimensional geological model of the subterranean domain;
 generating a facies model of the subterranean domain; and
 simulating the petroleum systems model on a geological time-scale to determine the rock maturity in the subterranean domain.

10. The system of claim 7, wherein the operations further comprise constructing a discrete fracture model of the subterranean domain to predict the fluid flow therein.

11. The system of claim 7, wherein:
 the identifying the potential drilling location comprises comparing the first sweet spot, the second sweet spot, and the third sweet spot.

12. The system of claim 7, wherein the operations further comprise designing a hydraulic fracture operation using a well drilled at the potential drilling location in the subterranean domain by constructing a discrete fracture network model of the subterranean domain.

13. A non-transitory computer-readable medium storing instructions that, when executed by one or more processors of a computing system, cause the computing system to perform operations, the operations comprising:
 obtaining data representing a subterranean domain, wherein the data comprises at least seismic data;
 inverting the seismic data, the inverting comprising:
  determining elastic and mechanical properties from a well-log using a rock-physics study,
  cross-plotting the elastic and the mechanical properties,
  identifying, based on the cross-plotting of the elastic and the mechanical properties, zones within a shale reservoir based on total organic content, and
  identifying a first sweet spot based on the identified zones;
 creating a petroleum systems model of the subterranean domain based at least in part on a result of inverting the seismic data, the creating comprising:
  simulating the petroleum systems model on a geological time-scale to determine rock maturity in the subterranean domain, and
  identifying a second sweet spot based on the determined rock maturity;
 simulating a dynamic reservoir model of the subterranean domain based at least in part on the petroleum systems model, the simulating comprising:
  simulating fluid flow in the subterranean domain to an end of history, and
  determining a third sweet spot based on an untapped hydrocarbon pore volume in the subterranean domain at the end of history; and
 identifying a potential drilling location based on a combination of the inverting of the seismic data, the creating the petroleum systems model, and the simulating the dynamic reservoir model to determine which of the first sweet spot, the second sweet spot, and the third sweet spot are corroborated.

14. The medium of claim 13, wherein the inverting the seismic data further comprises:
 determining total organic content in the subterranean domain.

15. The medium of claim 13, wherein the creating the petroleum systems model comprises:
 creating a three-dimensional geological model of the subterranean domain; and
 generating a facies model of the subterranean domain.

16. The medium of claim 15, wherein the operations further comprise constructing a discrete fracture model of the subterranean domain to predict the fluid flow therein.

17. The medium of claim 13, wherein:
 the identifying the potential drilling location comprises comparing the first sweet spot, the second sweet spot, and the third sweet spot.

* * * * *